Feb. 22, 1966 R. G. KNUDSEN ETAL 3,236,127
PRE-SET TORQUE MEASURING WRENCHES AND THE LIKE
Filed Nov. 6, 1963
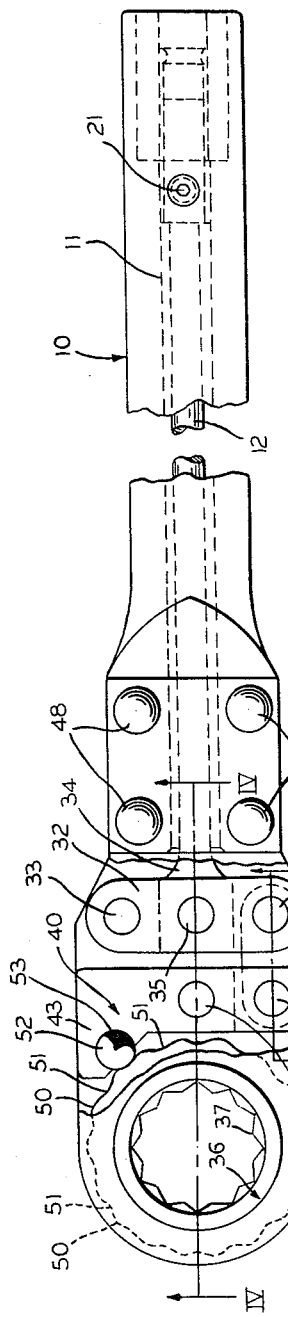
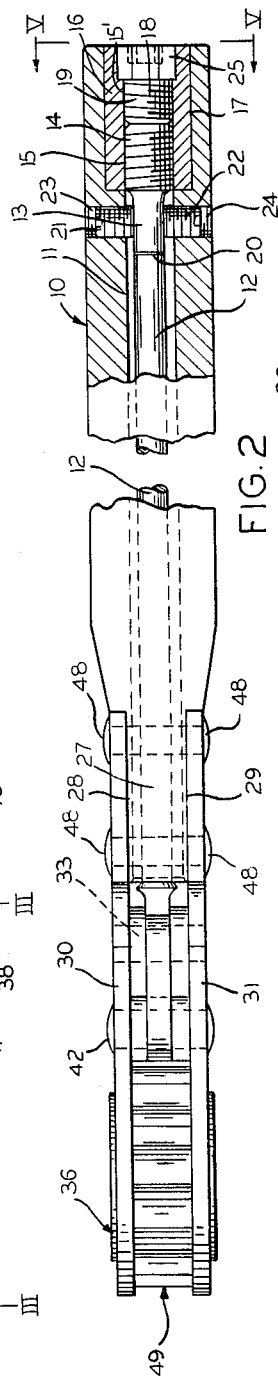
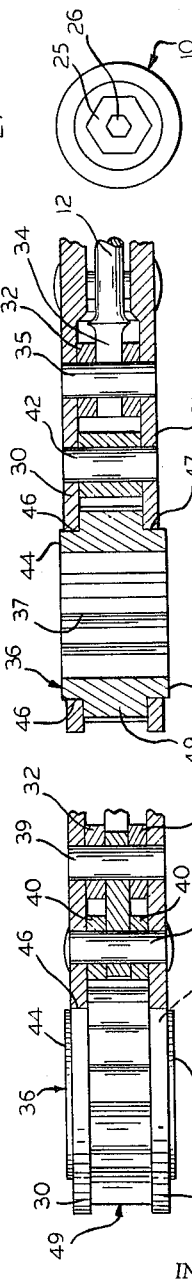
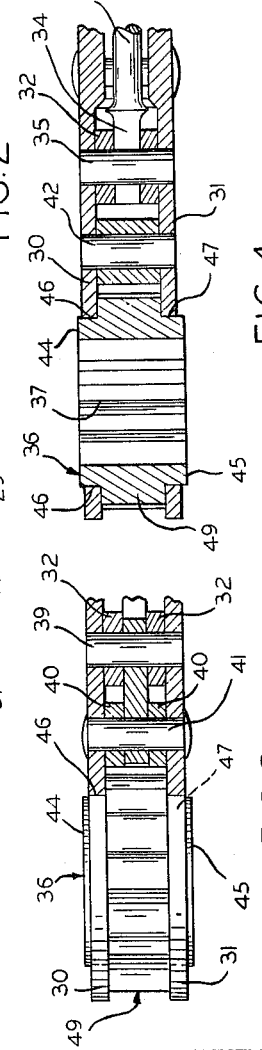
INVENTORS
RAYMOND G. KNUDSEN
GENE E. OLSON
BY
ATTORNEY

United States Patent Office 3,236,127
Patented Feb. 22, 1966

3,236,127
PRE-SET TORQUE MEASURING WRENCHES
AND THE LIKE
Raymond G. Knudsen and Gene E. Olson, Kenosha, Wis., assignors to Snap-On Tools Corporation, Kenosha, Wis., a corporation of Delaware
Filed Nov. 6, 1963, Ser. No. 321,868
8 Claims. (Cl. 81—52.4)

This invention relates to torque measuring wrenches and more particularly to pre-set torque applying devices which are rendered inoperative upon loading the measuring instrumentality to its pre-set load, although the features thereof may be employed with equal advantage for other purposes.

It contemplates more especially the provision of simple, dependable and accurate instrumentalities which can be pre-set preferably at the factory for a predetermined torque load to be applied therewith and, thereupon, mechanically releases to preclude any greater torque tightening functions to be performed therewith and thus indicating to the user that the operation of nut or other tightening functions or operations have been fulfilled.

The present invention is designed to overcome the requirement of relying upon a calibrated visual dial or indicator or other load determining instrumentalities that require attentive responsive interpretations that are time consuming, become tedious operations on a production line where repetition becomes a factor of split-second readings that vary depending upon the alertness of the attendant and the fatigue induced by such operations. Even in the use of such wrenches by mechanics in servicing operations, the indicator of the applied torque may not be readily accessible to the eyes of the user working in positions of difficulty or understrain in reaching fasteners in restricted locations so that a load release pre-set for a desired limit beyond the control of the user, is an important characteristic built into such precision instruments.

One object of the present invention is to simplify and improve the operation of pre-set torque wrenches which are primarily effective to mechanically release the applied load at a predetermined limit.

Another object is to provide an improved torque wrench of the pre-set type which will preclude torquing functions after the pre-set load has been applied therewith.

Still another object is to provide improved means for mechanically releasing the tightening functions of a torque wrench upon reaching its pre-set limit for tightening fasteners and the like.

A further object is to provide linkage in conjunction with a tensile measuring element so that torque applying functions will be impossible after the preset limit has been reached.

A still further object is to provide better and improved torque limiting instrumentalities which will mechanically release the instrumentalities for applying a torque load upon reaching the pre-set limit desired for any particular tightening operations.

Still a further object is to utilize a precision stretch measuring element in conjunction with torque load applying devices to mechanically release the instrumentalities upon reaching a predetermined torque load for which the mechanism is pre-set.

Other objects and advantages will appear from the following description of an illustrated embodiment of the present invention.

In the drawing:

FIGURE 1 is a front view of a device embodying features of the present invention, parts thereof being broken away to clarify the showing.

FIGURE 2 is an edge view in elevation of the device shown in FIGURE 1 with parts broken away and shown in section to clarify the illustration.

FIGURE 3 is a fragmentary sectional view in elevation taken substantially along line III—III of FIGURE 1.

FIGURE 4 is a fragmentary sectional view in elevation taken substantially along line IV—IV of FIGURE 1.

FIGURE 5 is an end view of the device taken substantially along line V—V of FIGURE 2.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a handle member 10 which has an elongated bore 11 extending through its longitudinal axis to freely receive a precision stretch or tensile measuring instrumentality such as a rod 12. The elasticity of the rod 12 determines the load at which the stretch or elongation will be sufficient to release the connection between the torque transmitting instrumentalities to be hereinafter described. It should be noted that the handle end of the rod 12 is welded or otherwise joined to the reduced neck portion 13 of an anchoring threaded shoulder 14 which engages a correspondingly threaded bore 15 in a bushing that is slip-fitted into the enlarged end bore 17 of the handle 10.

In order to hold the rod 12 with its anchoring stud 13–14 against any possible accidental movement, an oppositely threaded stud 18 engages a correspondingly threaded portion 19 in the bushing bore 15' for tight abutting engagement therewith for locking the rod stud 13–14 into preset position. The rod stud 13–14 is welded to the measuring rod 12 as at 20 to enable such to be cheaply manufactured rather than turned from a single rod of larger diameter than otherwise required. Diametrically oppose set screws 21–22 are threaded into apertures 23–24 to tightly engage the rod stud neck 13 to preclude accidental turning of the rod 12 after it is pre-set into position and calibrated at the factory. As shown, the locking stud 18 is provided with a hexagonal head 25 which, in turn, is hexagonally recessed as at 26 to enable it to be tightly turned against the rod stud 13–14 with an Allen wrench or the like to tightly lock the latter in its pre-set position. This is accomplished after the opposed set screws 23–24 are tightened.

The handle member 10 terminates in a flat under-cut end 27 having parallel flat surfaces 28–29 to which confronting plates 30–31 are attached as will appear more clearly hereinafter. Between the flat plates 30–31, there is provided a link 32 which is pivoted as at 33 between the plates 30–31. The pivotal link 32 is anchored to the enlarged head 34 of the rod 12 within the confines of the confronting plates 30–31 by means of a pin 35 which is free to move longitudinally with the rod 27 as tensile loads are imparted thereto by the work engaging member 36 which is polygonally recessed therethrough as at 37, in this instance, broached with a twelve point socket to engage nuts or other fasteners to be tightened therewith by imparting a turning moment thereto through the manual loading of the handle member 10.

As shown, the link 32 is pivoted at its end opposite to the pin mount 33 thereof, to another link 38 by means of a pin 39 and the other end of the link 38, in turn, is pivoted to a cross plate 40 by means of a pin 41. The cross plate 40 is pivotally mounted at its central point to a trunnion 42 anchored in the confronting face plates 30–31 to provide a free end region 43 that confronts and pivots relative to the work engaging member 36 which has oppositely disposed end bearings 44–45 for journalled support in circular openings 46–47 provided in the free ends of the confronting plates 30–31 attached to the handle member 10 by means of a plurality of rivets, in this instance four, which project through the flat end 27 of the handle member 10.

The work engaging member 36 is provided with a peripheral intermediate boss 49 which corresponds in thickness to the spacing of the confronting surface plates 30–31 attached to the handle member extremity 27 by means of the rivets 48. The boss 49 has its peripheral edge formed with a uniform series of alternate nodes 50 and troughs 51 to serve as a ratchet wheel in cooperation with a ball detent 52 which is complemental thereto for engagement therewith as an integral part of the cross-plate 40 or freely riding in a socket formed in the edge thereof as at 53 between it and the troughs of the ratchet wheel edge 49. The ball detent 52 will effect the driving engagement between the work engaging ratchet wheel 49 and the cross plate 40 so long as the rod 12 is not sufficiently stretched by the torque load on the work engaging member 36 to permit the ball detent 52 to ride out of the troughs 51 or a trough 51 with which it is engaged. Thus, the functional connection between the work engaging member 36 and the handle member 10 through the rod 12 and linkage 32, 38, 40 and detent 52 is maintained until the preset torque load stretches the rod 12 to a predetermined extent calibrated at the factory to permit the ball detent 52 to ride out of its trough 51 and thus release the functional connection between the parts that now can rotate relative to each other, namely the work engaging member 36 and the ball detent 52 carried by the cross plate 40 that pivots to accommodate the stretch in the calibrated rod 12.

When the user of the torque wrench described supra, feels the release of the ball detent 52 from its cooperating ratchet wheel 49 and the latter no longer responds to the force applied to the handle member 10, no further tightening is effected and the fastener does not continue further in its tightening rotation previously imparted thereto. This is accomplished without watching a calibrated dial or other visual measuring indicator, and the operator has no control in the determination of pre-setting the tightness so long as the force is applied to the handle 10 until the functional connection between the otherwise relatively moving parts is released responsive to a predetermined stretch occasioned responsive thereto or by the applied turning force to the handle 10 to the preset load for which the rod 12 is calibrated at the factory.

Any number of different wrenches calibrated for different preset loads can be supplied and this is especially advantageous for continuous production assembly lines with maximum speed and minimum error as there are no dials to observe nor any time lag in the operator's responses which may vary depending upon the alertness, fatigue and care exercised by the operator at different times of the day or on different days or times. With the teachings of the instant structure and instrumentalities, the stretch of the rod 12 which is always uniform and directly proportional to the torque load is the controlling factor without any human intervention so that more accurate results are attained in minimum time for each tightening operation.

While we have illustrated and described a preferred embodiment of the invention, it must be understood that the invention is capable of considerable variation and modification without departing from the spirit of the invention.

We, therefore, do not wish to be limited to the precise details of construction set forth, but desire to avail ourselves of such variations and modifications as come within the scope of the appended claims.

We claim:

1. In a torque wrench, the combination with a work engaging member, of a turning member for operative connection to said work engaging member, said operative connection between said work engaging and turning members comprising complemental clutching elements on said work engaging and turning members, and an elongated torque load tensile responsive member associated with said turning member to retain said complemental clutching elements operatively connected within the pre-calibrated range of said torque load responsive member and inoperatively declutched beyond the pre-calibrated range of said torque load tensile responsive member.

2. A torque wrench defined in claim 1 wherein the torque load tensile responsive member is operatively connected to the complemental clutching elements through linkage imparting a tensile stretch thereto responsive to rotating said turning member with the work engaging member in operative registry with a fastener.

3. A torque wrench defined in claim 2 wherein said linkage embodies a toggle pivotal arrangement to subject said torque load tensile responsive member to a stretching stress.

4. A torque wrench defined in claim 1 wherein the pre-calibrated torque load responsive member consists of an elongated normally self-sustaining rigid rod and pivotally connected toggle linkage for stretching said elongated rod responsive to a load impressed upon said work engaging member.

5. A torque wrench defined in claim 1 wherein the complemental clutching elements include a serrated wheel and a roller interposed between said work engaging member and said pre-calibrated torque load tensile responsive member to impart a stretching urge to said tensile responsive member.

6. A torque wrench defined in claim 5 wherein the pre-calibrated torque load responsive member consists of an elongated normally rigid tensile rod adjustably mounted in said turning member.

7. A torque wrench defined in claim 6 wherein toggle linkage is operatively interposed between said work engaging member and said elongated tensile responsive rod to impart the stretching urge to said tensile responsive member.

8. A torque wrench defined in claim 7 wherein the roller is interposed between said serrated wheel on said work engaging member and the toggle linkage to establish a slip arrangement when said elongated rod is stretched beyond the pre-calibrated limit range thereof.

References Cited by the Examiner

UNITED STATES PATENTS

| | | | |
|---|---|---|---|
| 2,332,972 | 10/1943 | Johnson | 81—52.4 |
| 2,972,271 | 2/1961 | Gill | 81—52.4 |

FOREIGN PATENTS 80,020  10/1955  Denmark.

WILLIAM FELDMAN, *Primary Examiner.*

MILTON S. MEHR, *Examiner.*